3,316,187
BINDER COMPOSITION
George J. Grosner, Milford, and Edward V. Huda, Stratford, Conn., assignors to Raybestos-Manhattan, Inc., Passaic, N.J., a corporation of New Jersey
No Drawing. Filed Nov. 13, 1961, Ser. No. 152,058
9 Claims. (Cl. 260—2.5)

This invention relates to improvements in binders and products produced therefrom, and particularly to a novel aqueous organic binder composition.

It is a particular object of the present invention to provide a novel aqueous binder composition for bonding, sealing, and caulking of masonry units (tile, cement block, cinder block, red brick, etc.).

It is a further object of the present invention to provide a thermosetting organic bonding material resistant to moisture and weathering conditions.

It is a further object of the present invention to provide a novel ambient temperature curing composition which has high tensile strength as compared to mortars, sealants, and caulking compounds heretofore used on masonry units and structures.

A further object of the present invention is to provide a composition with excellent heat resistance which can be spread with a controlled thickness range from about 1/32 inch to about 5/8 inch dependent on the amount of material used.

A further object of the present invention is to provide a novel structural bonding composition having high compressive and tensile strength.

A further object of the present invention is to provide a novel structural bonding composition adapted for use as aforesaid which, while having high tensile strength, is possessed of inherent flexibility.

It is a further object of the present invention to provide a plastic binder composition characterized by organic curable binder and organic elastomers in an aqueous system.

It is a further object of the present invention to provide a novel plastic binder composition with low density and excellent wet compression resistance.

The general composition of the present invention comprises the employment of an ambient temperature curable liquid synthetic resin and an ambient temperature curing agent therefor; an elastomeric agent for the composition, and a cellular organic filler material known as phenolic microballoons.

Typical ambient temperature curable resins which can be used as the resin binder constituent are epoxy resins. These resins in combination with suitable curing agents will provide a workable composition which will cure without the aid of added heat.

The epoxy resins useful in the present invention are organic compounds which contain at least one oxirane group and polymerizable functionality with ambient temperature curing agents. (This additional polymerizable functionality can be represented by unsaturation, hydroxyl substituents, halogen substituents, amino substituents, and various combinations thereof.)

A typical epoxy resin, which can be used as the resin binder constituent in the present invention, is one containing terminal epoxy groups. Representative of this class is the complex polymeric reaction product of polyhydric phenol with polyfunctional halohydrin, such as epichlorohydrin and glycerol dichlorohydrin. Usually the difunctional chlorohydrin is used in proportions in excess of that equivalent to the polyhydric phenol and less than that which is twice the equivalent amount. The reaction is carried out in the presence of caustic alkali which is usually employed in at least the quantity necessary to combine with the halogen halide liberated from the halohydrin and usually is employed in excess. The products obtained may contain terminal epoxy groups or terminal epoxy groups and terminal primary hydroxyl groups. In the complex reaction mixture, the terminal epoxy groups are generally in excess of the terminal primary hydroxyl groups. Typical polyhydric phenols include resorcinol and preferably the various bisphenols resulting from the condensation of phenol with aldehydes or ketones such as formaldehyde, acetaldehyde, acetone, methyl ethyl ketone, and the like, but preferably acetone or formaldehyde.

The molecular weight of the epoxy resins may be controlled by the relative proportions of the reactants as well as by the extent to which the reaction is carried on. Although the molecular weight of the resin is not critical, the resin should normally be in the form of a liquid, or a solid dissolved in a liquid.

The solid epoxy resins may be dissolved in a solvent such as ethylene glycol, methyl or ethyl ether, or in a reactive diluent such as allyl glycidyl ether or butyl glycidyl ether. The resins further may be modified by materials such as dibutyl phthalate.

The typical commercial epoxy resins mentioned above employed herein, are mixtures of polymers, the major component of the resin being the polyglycidyl ethers or polyhydric phenols such as bisphenol-A, and epichlorohydrin. By using an excess of epichlorohydrin, the lower molecular weight liquid polymers are formed, and with higher proportions of bisphenol higher molecular weight solid resins result.

A typical epoxy resin is an amber-colored liquid epoxy resin of medium viscosity at room temperature having an epoxy value of 0.355–0.400 per 100 grams. Another is a liquid epoxy resin having an epoxide equivalent of 180–195 grams of resin containing one gram equivalent of epoxide. Another is a liquid epoxy resin which has a viscosity of 450–650 centpoises at 25° C. and a weight per epoxide of 375–400.

A typical solid epoxy resin which can be used is one which has a softening point of 65–75° C. and an epoxide equivalent of 425–550. Another is one having a softening or melting point of 90–110° C. and an epoxy equivalent of 700–1000. The liquid and solid epoxy resins may be heated together in suitable proportion to form normally liquid resin mixtures. They may be also dissolved in reactive diluents or solvents.

Other typical known and useful epoxy resins are: epoxidized novolak resins prepared by condensing epichlorohydrin and novolak resin; aliphatic polyepoxides such as: poly allyl glycidal ether, butadiene dioxide, and 1-4 butandiol prepared from aliphatic unsaturated hydrocarbons such as butadiene, by epoxidation with peracetic acid; resorcinol diglycidal ether prepared from resorcinol and epichlorohydrin, by condensation or substitution; ortho cresol glycidal ethers prepared from creslos and polyglycidal ethers by condensation; epoxidized amino phenols prepared from para amino phenol condensation products containing unsaturation which is epoxidized by peracetic acid; aliphatic unsaturated polyepoxides prepared by selective epoxidation of unsaturation in hydrocarbon compounds; brominated and chlorinated polyepoxides prepared by bromination or chlorination of unsaturation in epoxide-containing compounds or by substitution of halogen in epoxides; phosphate based polyepoxides based on condensation of phosphate compounds and epichlorohydrin; epoxidized oils such as linseed oil and soybean oil; trifunctional aromatic epoxides composed of aromatic hydrocarbon compounds selectively substituted and epoxidized by peracetic acid; and phenol formaldehyde modified epoxide containing materials.

The ambient temperature curing agent for the foregoing epoxy resin binder component of the present invention can be a polyamide resin, such as those derived from polymeric fat acids and aliphatic polyamines. Typical of these polyamides are those made by reacting polymeric fat acids with ethylene diamine and/or diethylene triamine and the like. By this we mean poly alkyl polyamines and their homologs and derivatives. It is possible to produce agents having terminal amine groups or terminal carboxyl groups or in which some of the terminal groups are amine groups while others are carboxyl groups. Since both amine groups are useful in curing the epoxy resins, it will be apparent that a wide variety of these polyamides are useful for that purpose. Since the amine groups react more rapidly in curing the epoxy resin, it is preferred to employ polyamides containing sufficient amine groups to provide adequate cross linkage. Slower curing may be obtained by the use of those polyamides having excess carboxyl groups over the amine groups.

The polymeric fatty acids employed in preparing the polyamides are those resulting from the polymerization of drying or semidrying oils or the free acids or simple aliphatic alcohol esters of such acids. Suitable drying or semidrying oils include soy bean, linseed, tung, parilla, oiticica, cotton seed, tall, sunflower, safflower, dehydrated castor oil, and the like. In the polymerization process for the preparation of the polymeric fat acids, the fatty acids with sufficient double bond functionality combine for the most part to provide a mixture of dibasic and higher polymeric acids. The most common of these dimerized acids is dilinoleic acid. The term "polymeric fat acids" as used herein is intended to include the polymerized mixture of acids obtained, which mixtures usually contain a predominant portion of dimeric acids, a smaller quantity of trimeric and higher polymeric acids, and some residual monomer.

These polymeric fat acids may be reacted with a variety of aliphatic polyamines for the production of the polyamides resin. The amidification reaction may be carried out under the usual conditions employed for this purpose. Polyamides of this type generally have molecular weight varying from less than 1,000 to 10,000.

Typically suitable commercial polyamides are made by the condensation of dimerized or trimerized unsaturated fatty acids of vegetable oils, such as dilinoleic acid with aliphatic amines such as ethylene diamine.

Other ambient temperature liquid curing agents for the epoxy resins can also be used, some of which are co-reactants which require small amounts of catalytic agents in order to provide cures at ambient temperatures encountered with masonry construction. An example of such a co-reactant is a polysulfide which is a polythiodithiol polymer of low molecular weight of which is prepared from 98 mole percent of bis(2-chloroethyl) formal and 2 mole percent of trichloropropane.

A typical catalyst for such a co-reactant is 2-4-6 tri-dimethyl aminomethyl phenol known as D.M.P.-30. Such dimethylamino-methyl phenols are Mannich type bases produced by reaction of the appropriate phenol with formaldehyde and dimethyl amine.

The resin curing agent can also be modified with relatively small quantities of acids, amines, amides, and other basic components which have proved to be reactive with epoxy resins for the purposes of controlling the cure rate of the epoxy resins. Some of these reactive modifiers are aliphatic and aromatic primary, secondary, and tertiary amines, for example mono-di- and triethanol amines, dimethylaminoethanol, 2-ethyl-hexyl - amine, diisopropyl amine, diethylaminopropylamine, triethyl amine, tetraethylene pentamine, triethylene tetramine, diethylene, triamine, dibutylaminopropyl amine, menthane diamine, 2,4, 6, trimethylaminomethyl phenol, metaphenylene diamine, N-benzyl methylamine, piperidine, piperazine, pyridine, methyl nadic anhydride, alkendic anhydride, N-methyl morpholine, and tetramethylethylene diamine. Other suitable modifiers are aromatic and aliphatic polyamine adducts, for example an epoxy resin based on epichlorohydrin and bisphenol with an epoxide equivalent of 190–200 reacted with one mole of active hydrogen in diethylene triamine, propylene oxide reacted with diethylene triamine, and various materials prepared by modifying the above with acrylonitrile and bisphenol in varying percentages usually from 10 to 30% by weight. Aromatic polyamine adducts prepared by mixing one or more aromatic amines such as meta phenylene diamine or 4,4' diaminodiphenyl methane in excess with small quantities of bisphenol A, styrene oxide, or epichlorohydrinbisphenol liquid resins of low molecular weight have proved valuable as reactive modifiers when used in relatively small amounts.

The epoxy resin cure agent system can be extended by one or more natural or synthetic reactive resins. Typical examples of suitable resins and rosins are: polynuclear aromatic hydrocarbon mixtures, thermoplastic styrenes, para-coumarone-indenes, beta-pinenes, phenol modified coumarone indenes, methyl esters of rosin, primary alcohols from rosin, esters of polymerized rosin, chlorinated biphenol and polyphenols, ethylated sulfonamides, alkyl, aryl phosphates, condensation products of aryl sulfonamides and formaldehyde, and rosin modified phenolic and maleic resins. These modifiers can be added for the purpose of economy or modification of physical properties such as workability, tack, potlife, etc.

The epoxy and polyamide resins can be blended together to form the organic component of the binder system of the present invention. The relative amounts of the two resins may be varied within certain limits. Generally, the amounts by weight of the epoxy resin and polyamide resin will be in a ratio of epoxy-polyamide from about 10:90 to about 80:20. A preferred range is an epoxy-polyamide ratio of about 60:40. With higher amounts of the polyamide curing agent flexibility increases and strength decreases.

The plasticizer component of the present invention can be an aqueous latex of commercial solids content wherein the dispersed material is natural rubber or a synthetic rubber, examples of the latter being copolymers of styrene and butadiene; copolymers of acrylonitrile and butadiene; polychloroprene; and butyl rubber, the latter being a copolymer of isobutylene and isoprene.

Lattices of synthetic and natural resins such as polyvinyl butyral, polyvinyl acetate, methyl methacrylate and copolymers thereof, plasticized petroleum resins, terpene hydrocarbons, and rosin can also be used. The synthetic resins polyacrylamide and polyvinyl alcohol can be used as aqueous solutions.

Some other compatible materials which provide desirable working properties are low molecular weight fluids or polymers, such as ethylene glycol, liquid polyurethanes, liquid polysulfides, liquid butadiene styrene rubber, liquid butadiene acrylonitrile rubbers, and liquid polyglycols and substituted polyglycols.

The incorporated materials not only enhance flexibility and reduce brittleness of the set or hardened composition, but also provide a smooth cohesive viscosity to the unset mixture which aids in distribution thereof.

Certain materials such as ethylene glycol improve working characteristics such as viscosity reduction and spreadability and incidently lower freeze point.

The cellular organic filler material known as phenolic microballoons are minute hollow spheres with an average diameter of 0.0017 inch and filled with an inert gas, primarily nitrogen, which is contained by the walls of the resin sphere. The walls of these spheres are essentially of thermoset phenolic resin i.e. a phenol formaldehyde resin. These spheres have the following average dimensions:

| | |
|---|---|
| Size range, inches in diameter | 0.0002–.005 |
| Bulk density, lbs./cu. ft. | 3–5 |
| Actual sphere density, lbs./cu. ft. | 12 |
| Sp. gravity | 0.25–0.35 |
| Density (air displacement), grams/cc. | 0.30–0.45 |

The above material imparts to the final composition, wet compression resistance, heat resistance, high bulking, as well as good mechanical strength, properties which are not obtained with other fillers such as talc, amorphous silica, clay, and the like.

The mechanical strength of the sphere is well known, and this property is imparted to the present aqueous organic binder composition. Wet and dry compression strengths are dependent on this mechanical strength.

Other fillers and modifiers such as asbestos, carbon blacks, talcs, calcium carbonates, glass fibers, sand, micas, wood flour, clays, silicas, barytes, aluminum oxides, zinc oxides, lead oxides and titanium dioxides can be added to the present composition. These modifiers are added to increase bulk, reduce cost, add thixotropy, or other specific properties. Partial replacement can be made with these modifiers where ultimate strength is not as important as cost, viscosity, thixotropy, bulk, etc. or when the present compositions are used as caulking or sealing materials.

For the purpose of developing special characteristics, various additives can be incorporated into the above described composition. Pigments or dyes can be introduced for the purpose of matching color of the present composition to color of material being bonded or repaired. Surface active agents such as the alkyl aryl sulfonates and others can be added or introduced to give smoother working mixture, reduce time of mixing, reduce number of operations in mixing, avoid lumps or agglomerates in the mix, reduce viscosity, or to provide better surface wetting, etc. Other specific properties can be gained by adding freeze resistant agents, anti bacterial agents, and the like and are herein described as additives.

The components forming the composition of the present invention can be employed in the following proportions or parts by volume, which are given for the purpose of illustration and not limitation.

In the present invention, the phenolic microballoons are a characterizing component and comprise from about 20% to about 75% by volume of the present composition.

The curable organic binder, i.e. resin plus curing agent, likewise being a characterizing component comprises from about 10% to about 60% by volume in the present composition.

The plasticizer which is also a characterizing component comprises from about 2% to about 35% of the total volume.

The water of the present invention is also a characterizing component and comprises from about 15% to about 40% of the volume of the present composition in its plastic form. The water component, in whole or part comprises the water of the aqueous dispersion of latex.

The balance, if any, is composed of the other unreactive resins and inorganic fillers herebefore specified.

The following examples are illustrative of the compositions of the present invention, all proportions being in percent by volume:

Example 1

| | Percent by volume |
|---|---|
| Phenolic microballoons | 26.80 |
| Butadiene-styrene copolymer latex (45% solids) | [1] 12.90 |
| Water | 31.38 |
| Epichlorohydrin-bisphenol A liquid epoxy resin. Epoxy equivalent weight 175–210 | 16.09 |
| Liquid polyamide-amine value 290–320 obtained by condensation dilinoleic acid and ethylene diamine | 12.83 |

[1] Solids.

Example 2

| | |
|---|---|
| Phenolic microballoons | 26.80 |
| Butadiene-acrylonitrile copolymer latex (50% solids) | [1] 12.90 |
| Water | 31.38 |
| Epoxidized Novalak resin-epoxy equivalent 180–220 | 16.09 |
| Polysulfide resin (a polythiodithiol polymer of low molecular weight of which is prepared from 98 mole percent of bis(2-chloroethyl) formal and 2 mole percent of trichloropropane) | 10.83 |
| 2,4,6 tri-dimethylamino methyl phenol | 2.00 |

[1] Solids.

Example 3

| | |
|---|---|
| Phenolic microballoons | 26.80 |
| Styrene latex (50% solids) | [1] 6.45 |
| Water | 25.10 |
| Epoxy resin-resorcinol diglycidal ether | 16.09 |
| Polyamide resin-amine value 210–220 | 12.83 |
| Liquid butadiene styrene copolymer rubber [2] | 12.73 |

[1] Solids.

[2] Modifier added to improve flow of final mix and reduce cost.

Example 4

| | |
|---|---|
| Phenolic microballoons | 21.00 |
| Polyvinyl acetate emulsion (50% solids) | [1] 12.90 |
| Water | 20.08 |
| Epoxidized p-amino phenol type resin | 16.09 |
| Polyamide resin-amine value 350–400 | 12.83 |
| Aluminum silicate | 17.10 |

[1] Solids.

Example 5

| | |
|---|---|
| Phenolic microballoons | 26.80 |
| Butadiene-styrene copolymer latex (45% solids) | [1] 10.90 |
| Water | 31.38 |
| Epoxy resin-epichlorohydrin bisphenol A type | 16.09 |
| Polyamide resin-amino value 210–220 | 12.88 |
| Accelerator | 2.0–5.0 |

[1] Solids.

Accelerator was an adduct prepared by reacting one mole of active hydrogen in diethylene triamine with an epoxy resin with an epoxide equivalent of 175–210 which is based on epichlorohydrin and bisphenol A. The range given will produce various reaction rates with the lower proportion being the slowest and the higher range very fast curing. Addition of this accelerator may be most desirable when the present composition must be applied at temperatures at or below 32° F. Accelerator can replace part of polyamide at higher concentration range.

In preparing the compositions of the present invention, the various components are generally maintained separate until shortly before use because of their ambient temperature curing properties. In some instances, two or more components which do not react with each other can be pre-mixed.

When a composition such as in Example 1 is employed the components are each separately packaged, except that the latex plasticizer, generally contains the entire water requirement. This latex is then mixed with the phenolic microballoons to form a mix free of lumps.

The reactive liquid resin is separately mixed with the ambient temperature curing agent to form a homogeneous mass. Cure of the resin starts promptly upon mixture of the two.

Immediately after these separate pre-mixes are made they are mixed together. Further cure of the blend begins immediately accompanied by a change in viscosity from a thin watery mix to a smooth creamy almost pourable heavy paste.

A similar mix can be made by pre-mixing the water, latex, and liquid epoxy resin. This is then mixed in the order of phenolic microballoons to the above mentioned liquids until a smooth consistency is obtained, followed by addition of the resin curing agent.

When a solvent solution or normally liquid plasticizer is used, it may be added to the water or resin components, depending upon compatability.

Any filler materials employed can here be incorporated with either the phenolic microballoons, plasticizer, premix, or into the final mixture.

The final mixture remains plastic for about one to about two hours, during which time it is applied by suitable spreading means, depending upon its consistency or viscosity, such as brush, trowel, roller or caulking gun.

The final mixture retains sufficient flexibility when cured to provide for shrinkage inherent in masonry structures and usually will not crack or check when subjected to stresses of compression or tensile due to such inherent shrinking.

The composition does not require any heat cure; it sets in about ten minutes to two hours sufficiently so that a unit will remain bonded or sealed and can be lifted without other support.

Block or bricks bonded together have such tensile strength that the present invention will fracture the masonry when tested according to ASTM C-321.

The joints in structures previously erected with conventional sand cement mortars or plastic mortars may be sealed (pointed) with the product of this invention. Joints so made offer excellent water and heat resistance.

As an example of the heat resistance of the present invention the following data was obtained with samples prepared in accordance with ASTM C-321. Binder compositions were allowed to cure for 72 hours at 25±2° C. before testing with the exception of sand cement mortar which was cured for 28 days.

| Material Composition | Bond Strength, p.s.i. | | |
|---|---|---|---|
| | Room Temp. | Aged 1 hr. at 600° F., tested at R.T. | Aged 6 hrs. at 600° F., tested at R.T. |
| Bisphenol-epichlorohydrin epoxy resin composition | 460 | 0 | 0 |
| Conventional sand-cement mortar (3-1) | 50–70 | 50–70 | 50–70 |
| Bonding agents as per examples 1–5 | 400 | 400 | 226 |
| Bonding agent I with amorphous silicon replacing phenolic microballoons-complete replacement | 300 | 114 | 0 |
| Bonding agent II with aluminum silicate replacing phenolic microballoons-complete replacement | 300 | 75 | 45 |

Bonding agents I and II were prepared as per Example 1 except that all phenolic microballoons were replaced by inert filler. System was of the same aqueous dispersion type as described in this invention.

In addition to masonry use, the composition of the present invention can be used as a sealing and bonding agent for such things as swimming and wading pools, porches and steps, for filling in of cracks, highway and city curbings, house porches and patios, restoration of brick chimneys, tree sealants and many others, as will be apparent to those skilled in the art.

In addition the cured composition can be used per se in suitable shaped form such as blocks, and other receptacles.

We claim:

1. A plastic (aqueous binder composition comprising a mixture of the following in percent by volume: minute gas filled hollow cured phenol formaldehyde microballoons from about 20 to about 75%, plasticizer from about 2 to about 35% of the group consisting of aqeuos latices of synthetic rubbers and synthetic resins, water from about 15 to about 40%, and synthetic ambient temperature curable epoxy resin and curing agent therefor from about 10 to about 60%.

2. The composition of claim 1 wherein the curable resin is an epoxide containing at least one oxirane group and polymerizable functionality with ambient temperature curing agents.

3. The composition of claim 1 wherein the curing agent is a polyamide.

4. The composition of claim 1 wherein the curing agent comprises a liquid polythiodithiol polymer of low molecular weight.

5. The composition of claim 1 wherein the plasticizer is a combination of aqueous latex and liquid synthetic rubber.

6. The composition of claim 1 including relatively inert inorganic filler.

7. The process which comprises forming a plastic aqueous binder composition by, separately mixing plasticizer of the group consisting of aqueous latices of synthetic rubbers and synthetic resins, water and minute gas filled hollow cured phenol formaldehyde microballoons; separately mixing synthetic ambient temperature curing epoxy resin and curing agent for said resin; and then promptly mixing said separately formed mixes and subsequently permitting said composition to dry and cure.

8. The process which comprises forming a plastic, aqueous binder composition by, separately mixing plasticizer of the group consisting of aqueous latices of synthetic rubbers and synthetic resins, water, synthetic ambient temperature curable epoxy resin and minute gas filled hollow cured phenol formaldehyde microballoons, and then adding ambient temperature curing agent for said resin and subsequently permitting said composition to dry and cure.

9. The dried and cured residue of the composition of claim 1.

References Cited by the Examiner

UNITED STATES PATENTS

| | | | |
|---|---|---|---|
| 2,797,201 | 6/1957 | Veatch et al. | 260—2.5 |
| 2,806,509 | 9/1957 | Bozzacco et al. | 260—2.5 |
| 2,886,473 | 5/1959 | Schroeder | 260—837 |
| 2,993,014 | 7/1961 | Schardt | 206—2.5 |
| 3,062,682 | 11/1962 | Morgan et al. | 260—2.5 |

FOREIGN PATENTS 796,623  7/1958  Great Britain.

MURRAY TILLMAN, Primary Examiner.

LEON J. BERCOVITZ, JAMES A. SEIDLECK, M. FOELAK, Assistant Examiners.